(No Model.)
J. G. O'NEILL.
PROCESS OF SEPARATING AND COLLECTING GERMS FROM CORN.
No. 567,790. Patented Sept. 15, 1896.
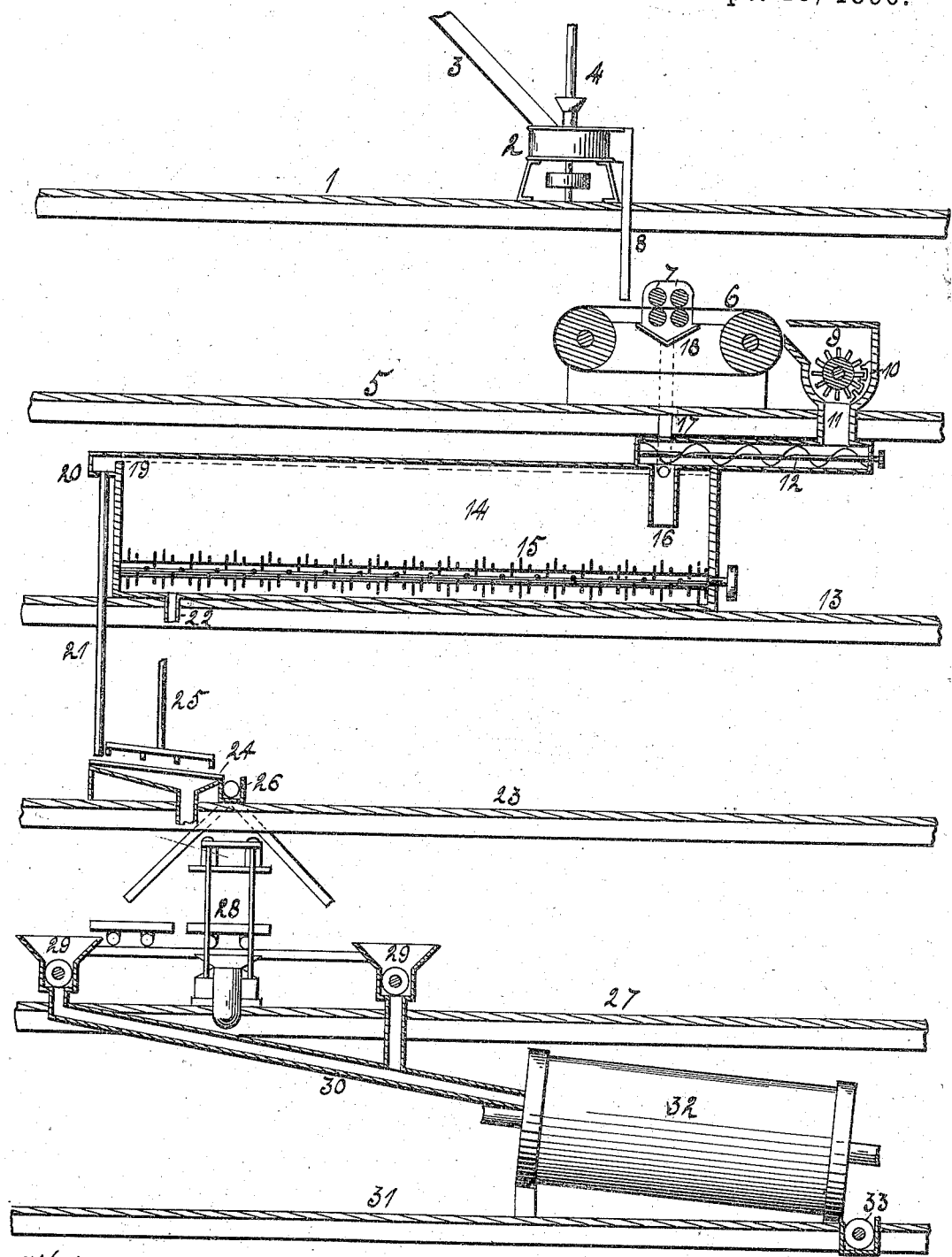
Witnesses:
N. K. Lillibridge.
E. Behel.
Inventor:
John G. O'Neill.
By A. O. Behel
Atty.

UNITED STATES PATENT OFFICE.

JOHN G. O'NEILL, OF ROCKFORD, ILLINOIS, ASSIGNOR TO THE ROCKFORD SUGAR REFINING COMPANY, LIMITED, OF SAME PLACE.

PROCESS OF SEPARATING AND COLLECTING GERMS FROM CORN.

SPECIFICATION forming part of Letters Patent No. 567,790, dated September 15, 1896.

Application filed July 7, 1896. Serial No. 598,340. (No specimens.)

*To all whom it may concern:*

Be it known that I, JOHN G. O'NEILL, a citizen of the United States, residing at Rockford, in the county of Winnebago and State of Illinois, have invented certain new and useful Improvements in Processes of Separating and Collecting Germs from Corn, of which the following is a specification.

This invention relates to the treatment of corn in order to separate and collect the germs thereof; and it consists in grinding the corn after being steeped, passing it through a slop-machine to express the liquor, submitting the hulls and germs to the action of a threshing-machine, separating the germs from the hulls by passing through a separator, subjecting the germs to the action of a sieve to wash the starch particles therefrom, subjecting the germs to the action of a press expelling the water, and finally passing the germs through a drier.

In the accompanying drawing I have shown the arrangement of mechanism for carrying out my improved process, which is shown located upon different floors in order that gravity may be used in conveying the corn through the different steps.

Upon the top floor 1 is located a grinding-mill 2, of any suitable construction, the steeped corn being fed to the mill through the spout 3 and water for grinding through the pipe 4.

Upon the floor 5 is located a slop-machine composed of an endless carrier 6 and rollers 7. The ground corn is conveyed to the carriers of the slop-machine by the pipe 8. At the delivery end of the slop-machine is located a threshing-machine composed of a cylinder 9, provided with radially-extending teeth which rotate between the teeth of a concave 10. The lower portion of the threshing-machine has a discharge-opening 11, which communicates with a conveyer 12, located just below this floor.

The floor 13 supports a separator composed of a body portion 14, in the bottom of which is supported an agitator 15. A spout 16, communicating with the conveyer 12, extends some distance within the separator, and a pipe 17 connects with the spout and with a trough 18, located beneath the rollers 7 of the slop-machine, which conveys the liquor extracted from the ground corn to the separator.

One end of the separator has a discharge 19, which empties into a trough 20, from which a pipe 21 extends through the floor. An outlet 22 is formed in the bottom of the separator.

The floor 23 supports a sieve 24, having a water supply 25 and conveyer 26.

The pipe 21 from the separator communicates with the sieve 24.

The floor 27 supports a press 28, of any suitable construction, having a conveyer 29 at either side connecting with a pipe 30.

The bottom floor 31 supports a drier 32 of the rotating variety, having a conveyer 33 located at its discharge end. The pipe 30 extending from the press communicates with the upper end of the drier.

The corn is ground in water in the mill and is discharged upon the conveyer of the slop-machine which passes through the rolls, thereby squeezing out the starch liquor, which is discharged into the trough 13. The hulls and germs are discharged into the threshing-machine, where they are broken up and the germs separated from the hulls and discharged into the conveyer and carried to the separator and discharged therein and mixed with the starch liquor coming from the slop-machine. The separator, being filled with the hulls, germs, and starch liquor, is agitated by the agitator 15, which will cause the germs, being lighter than the hulls, to rise to the top of the starch liquor and overflow with the starch liquor onto the sieve, over which they pass and are washed by a stream of water passing through the pipe 25. This washing process takes out all the starch particles, leaving the germs clean, which are discharged into the conveyer located at the discharge end of the sieve. This conveyer carries the germs to the press, where the water is expelled, the germs passing into the hopper 29 and into the drier, where they are sufficiently dried and discharged into the conveyer located at the discharge end of the drier, which conveys them to the proper place where the oil is extracted by any of the known methods.

It is evident that the construction of the mechanical appliances made use of in carrying out my process may be changed without departing from the scope of my invention.

I claim as my invention—

The process substantially as before set forth of separating and collecting the germs from corn by grinding the corn in water, subjecting the wet material to pressure, disintegrating the hulls and germs, separating the germs from the hulls by the action of starch liquor, washing the germs, subjecting them to pressure and finally to heat.

JOHN G. O'NEILL.

Witnesses:
THEO. H. KRAFT,
A. O. BEHEL.